Inventor
Robert H. Goddard
By attorney
Chas. T. Hawley

March 12, 1946.  R. H. GODDARD  2,396,568
APPARATUS FOR STEERING AIRCRAFT
Filed June 24, 1942  2 Sheets-Sheet 2
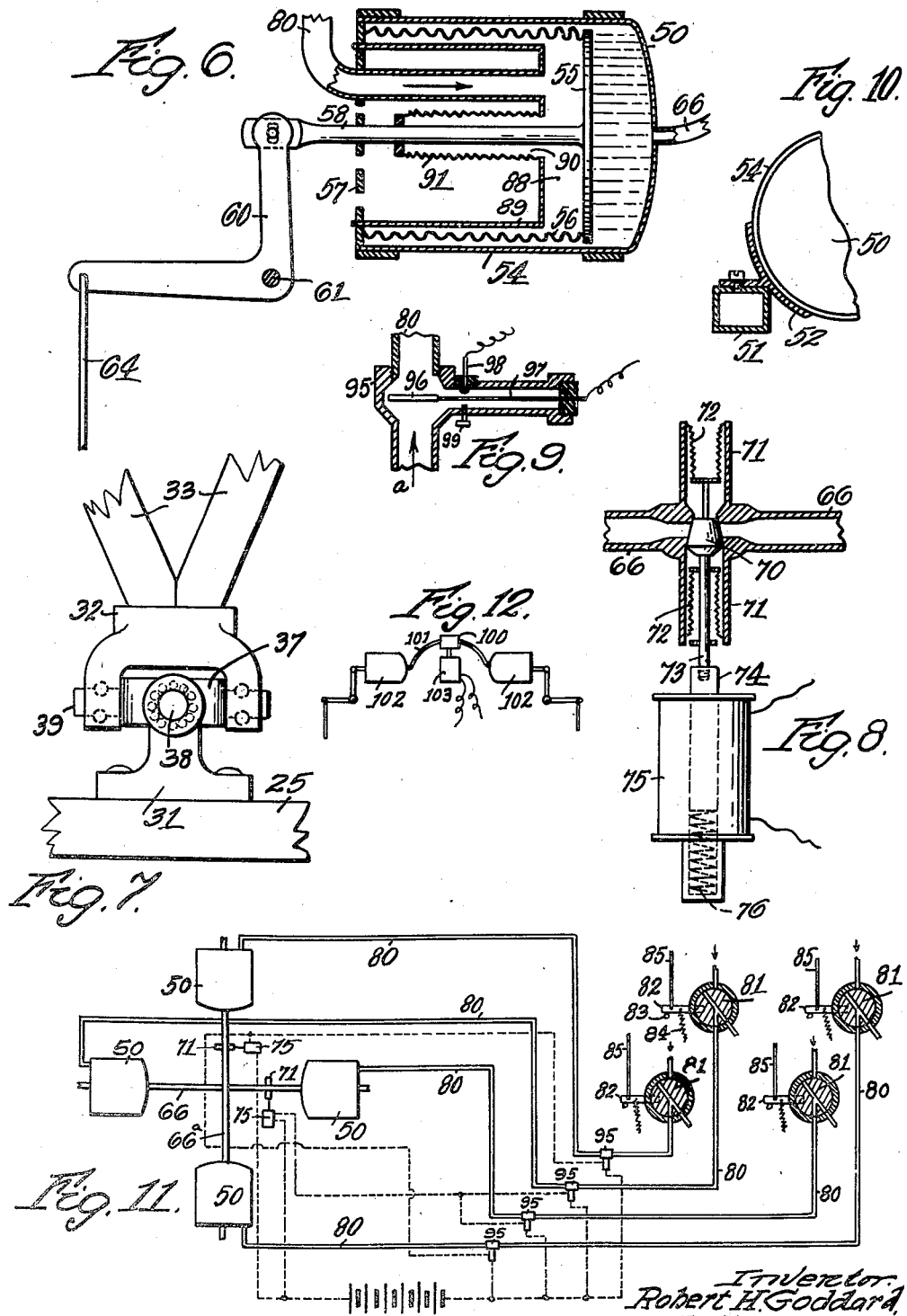
Inventor.
Robert H. Goddard
By Attorney Patented Mar. 12, 1946

2,396,568

UNITED STATES PATENT OFFICE 2,396,568

APPARATUS FOR STEERING AIRCRAFT

Robert H. Goddard, Roswell, N. Mex., assignor of one-half to The Daniel and Florence Guggenheim Foundation, New York, N. Y., a corporation of New York Application June 24, 1942, Serial No. 448,279

5 Claims. (Cl. 244—78)

This invention relates to the steering of aircraft and particularly to the steering of aircraft which is rocket-propelled, at least in part.

More specifically, my invention relates to aircraft of the general construction and method of control shown in my prior Patent No. 2,183,311, issued December 12, 1939. In said patent, the outer casing of the aircraft is made in longitudinally successive sections, one or more of which sections may be moved angularly out of axial alignment with the remaining sections to produce a steering or flight-corrective effect.

In the operation of such aircraft, a continued corrective effect may be required, due to a shift in the load, changes in speed or wind-resistance, changes in the amount or location of the fuel supply, or other causes tending to produce a continued deflection from the desired direction of flight.

It is the general object of my present invention to provide improved apparatus for effecting relative angular displacement between longitudinally successive sections of an aircraft casing.

A further object of the invention is to provide apparatus for producing such displacement which will be automatically locked in every angular relationship of the casing sections, and which will remain locked until the steering apparatus is put in operation to bring about a different relationship.

My invention further relates to arrangements and combinations of parts which will be hereinafter described and more particularly pointed out in the appended claims.

Preferred forms of the invention are shown in the drawings, in which

Fig. 1 is a sectional side elevation of a rear portion of an aircraft embodying my invention;

Figs. 2, 3 and 4 are transverse sectional views, taken along the lines 2—2, 3—3 and 4—4 in Fig. 1;

Fig. 6 is an enlarged sectional side elevation of an operating member and certain associated parts;

Fig. 7 is an enlarged side elevation of a universal connection between casing sections;

Fig. 8 is a side elevation, partly in section, of a solenoid-operated valve forming an automatic locking device;

Fig. 9 is a sectional side elevation of a control device for the solenoid shown in Fig. 8;

Fig. 10 is a detail sectional view of structure to support an operator such as is shown in Fig. 6;

Fig. 11 is a diagrammatic view showing electrical, pneumatic and hydraulic control circuits for my improved steering apparatus; and Fig. 12 is a side elevation of a modification to be described.

Figure 1:
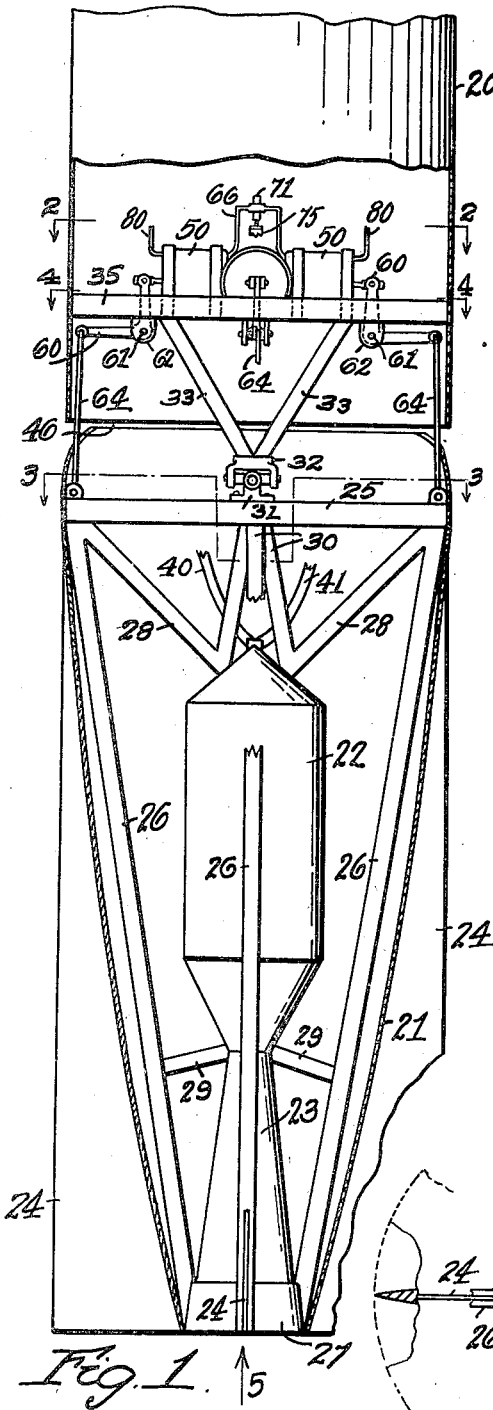
Figure 5:
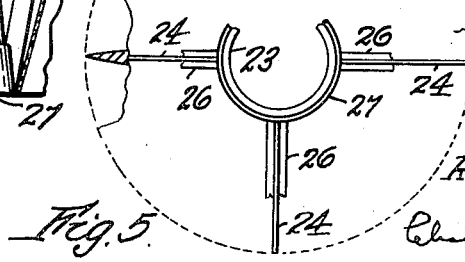
Fig. 5 is a rear view, partly in section, and looking in the direction of the arrow 5 in Fig. 1.

Referring to Fig. 1, I have shown parts of an aircraft casing comprising a forward casing member 20 and a rear casing member 21. The rear member 21 is preferably stream-lined and encloses a combustion chamber 22 and a rearwardly-directed reaction nozzle 23. Stabilizing and steering vanes 24 (Figs. 1 and 5) are spaced about the rear casing member 21.

At its front end, the casing member 21 is connected to a rigid and substantial ring 25, which in turn is connected by brace bars 26 to a ring 27 which receives the forward thrust of the rear or outer end of the nozzle 23. Additional brace bars 28 connect the ring 25 with the front end of the combustion chamber 22, and cross braces 29 are interposed between the brace bars 26 and the narrow connection between the combustion chamber 22 and nozzle 23.

Figure 4:
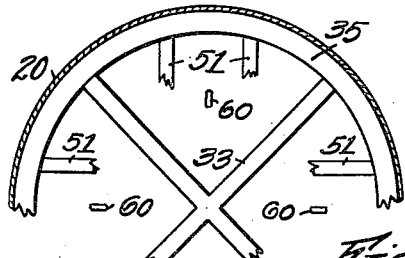

A plurality of brace bars 30 extend upward from the brace bars 28 and from the front end of the combustion chamber 22 and converge to support one element 31 of a universal pivotal connection between the casing members 20 and 21. The upper part 32 of this universal connection is connected by brace bars 33 (Fig. 4) to an upper rigid ring 35 fixed in the forward casing member 20.

The parts 31 and 32 of the universal connection between the casing members 20 and 21 are shown in detail in Fig. 7. The connection also comprises a swivel ring 37 having bearings 38 in the part 31 and bearings 39 in the part 32. The axes of both sets of bearings pass through the center of the ring 37 but are perpendicular to each other. Preferably, anti-friction balls or rollers are provided for the bearings 38 and 39.

Figure 2:
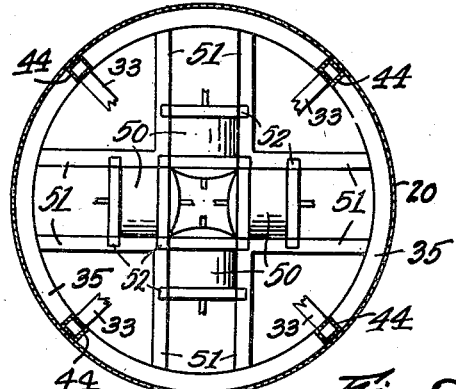
Figure 3:
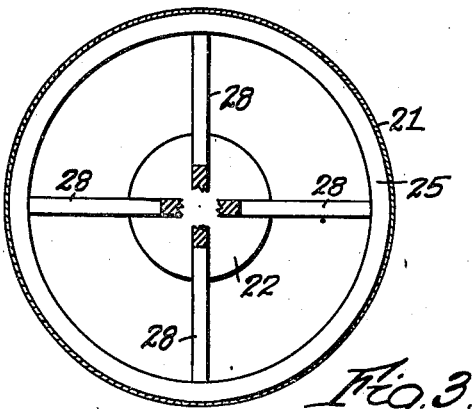

Flexible pipes 40 and 41 (Fig. 1) are provided to conduct liquid fuel and a liquid oxidizing agent to the combustion chamber 22 from suitable storage tanks (not shown) in the front portion of the aircraft, which front portion is preferably supported on the ring 35 by rectangular tubular struts 44 (Fig. 2).

With this construction, the rear casing member 21 is pivotally connected to the front casing member 20 at a point which is at all times in the axes of both casing members and which is also permanently in alignment with the axis of the combustion chamber 22 and nozzle 23, so that the reactive thrust of the rocket propulsion is exerted directly against the axially positioned pivotal connection above described.

The rings 25 and 35 are of the same diameter, and the front portion of the casing member 21 along the line 3—3 (Fig. 1) is of the same diameter as the casing member 20 but curves inward above the line 3—3, and substantially concentric with the pivotal connection between the casing members. The space 46 between the adjacent ends of the casing members 20 and 21 permits the escape of gasoline vapors which might otherwise accumulate by leakage in the casing member 20. Exhaust gases from any apparatus in the front casing member 20 may also escape through the space 46.

I will now describe the special apparatus which I have provided for shifting the rear casing member 21 angularly relative to the forward casing member 20. For this purpose I provide a plurality of combined pneumatic and hydraulic operators 50, mounted on cross frame members 51 (Figs. 2 and 10) which frame members are carried by the ring 35. The operators are secured to the cross frame members by brackets 52.

Each operator 50 comprises an outer casing or cylinder 54 (Fig. 6) in which a piston 55 is loosely and movably supported by a bellows member 56. The outer end of the bellows member is secured to a perforated casing end plate 57 which also provides a bearing for a piston rod 58.

At its outer end, each piston rod 58 has a pin-and-slot connection to one arm of a bell crank 60, pivoted at 61 to a bearing bracket 62 (Fig. 1) secured to associated cross frame members 51 carried by the ring 35.

The outer arm of each bell crank 60 is connected by a link 64 to the ring 25 previously described and which supports the rear casing member 21, the combustion chamber 22, the nozzle 23 and other associated parts. The lower ends of the links 64 are swivel connected to the ring 25 to permit displacement of the ring about two perpendicular and transverse axes. The inwardly curved upper end of the rear casing member 21 is slotted to accommodate the links 64, as shown in Fig. 1.

The outward displacement of each piston 55 (Fig. 6) is limited by engagement thereof with the end of the outer casing 50, and the extreme displacement of the rear casing member 21 to which the pistons are connected is similarly limited.

Diametrically opposed operators 50 are connected in pairs by pipes 66 and 66ᵃ (Fig. 11), and the hydraulic unit formed by each pair of operators 50 and the connecting pipe 66 or 66ᵃ is filled with a suitable liquid after the operators are connected to the ring 25.

Any movement of the ring 25 with respect to the ring 35 about either of said perpendicular transverse axes will necessarily involve transfer of liquid from one hydraulic cylinder to the opposite cylinder 54 in the pair of opposed operators involved in such movement. If such transfer of liquid is prevented, the rings 25 and 35 and attached casing members 20 and 21 will be held in fixed relation.

To effect this result, I provide a separate valve 70 (Fig. 8) in each cross connection 66 or 66ᵃ. Each valve 70 is slidably positioned in a cross tube 71 by bellows connections 72, thereby reducing friction and balancing internal pressures. Each valve 70 is connected by a rod 73 to a plunger 74 slidable in a solenoid 75. The plunger is normally pressed upward by a spring 76 to close the valve 70. Unless the solenoid 75 is energized, the valve 70 remains closed and no relative movement of the rings 25 and 35 or of the attached casing members can take place.

Pneumatic power for each operator 50 is supplied through a pipe 80 (Fig. 6) from a suitable pressure tank (not shown) through a three-way valve 81 (Fig. 11). Each valve 81 may be provided with an arm 82 normally held against a stop pin 83 by a spring 84. A pull rod 85 for each valve 81 may be operated manually or otherwise to shift its valve 81 to admit pressure to the associated pipe 80 when a change in the relationship of the casing members 20 and 21 is desired. Normally each pipe 80 is vented through its valve 81.

Each pipe 80 connects with a chamber 88 (Fig. 6) provided between the piston 55 and an inwardly projecting inner casing 89, mounted inside of the bellows member 56. An opening 90 is provided in the inner casing 89 for the piston rod 58, and a bellows packing 91 is provided between the piston rod and the inner casing.

It will be understood that throughout this specification and in the appended claims the term "hydraulic" is used broadly to include water, oil or other suitable liquid, and the term "pneumatic" is similarly used to include air, steam or other suitable gas or vapor.

The described operating mechanism functions as follows:

Pneumatic pressure applied through any pipe 80 tends to move the piston 55 of the associated operator 50 to the right as shown in Fig. 6, with corresponding angular displacement of the ring 25 to which each piston 55 is connected. But such movement of any piston can actually take place only if the associated valve 70 is open, so that the liquid in the casing 54 of one operator 50 may be transferred to the casing 54 of the opposed operator.

One of the solenoids 75 (Fig. 8) must be energized to open a valve 70 before such transfer of liquid can occur. I accordingly provide a circuit-closing device 95 (Fig. 9) for each pneumatic control pipe 80 and I connect the two devices 95 in the pipes 80 for each pair of opposed operators 50 in parallel to control the single valve 70 in the pipe connecting said operators.

Each device 95 comprises a vane 96 (Fig. 9) mounted on a resilient support 97 and normally positioned as shown in Fig. 9, out of engagement with a contact 98 and a stop screw 99. If air or gas is caused to flow through one of the pipes 80 in the direction of the arrow $a$ to induce movement of an associated piston 55, the corresponding vane 96 will be deflected to engage its contact 98 and close a circuit through the solenoid 75 which opens the associated locking valve 70. This valve 70 will thereupon be opened and will be held open as long as flow through the pipe 80 continues and holds the vane 96 deflected.

As soon as such air or gas flow is stopped by the release and closing of the three-way valve 81, the vane 96 will return to mid-position, breaking the solenoid circuit. The valve 70 will then close automatically and will lock the parts from further movement.

When air or gas is being ejected from one operator by pressure applied to the opposed operator, the displacement of the vane 96 for the first operator will be limited by the adjustable stop screw 99.

Instead of opening the three-way valves 81 manually, they may be operated by a gyroscopic flight-control mechanism, such, for instance, as is shown in my prior Patent No. 1,879,187.

The solenoids 75 may be operated by current from a battery B (Fig. 11) or from any other suitable source, and all electrical connections are clearly shown in broken lines in Fig. 11.

The horizontal mounting of the operators 50 and the provision of the bell cranks 60 is of particular advantage, as its permits me to use operators of any desired size, while at the same time connection can be made to the ring 25 at points closely adjacent its outer diameter. I thus obtain the maximum operating arms for swinging the casing member 21 and associated parts relative to the casing member 20.

Obviously, the larger the radius at which power is applied, the less force will be required to produce a given displacement. Also, by placing the pivotal support of the rear casing member 21 in the axis of the combustion chamber 22 and nozzle 23, the thrust of the rocket discharge is exerted directly against the pivotal support, so that only a moderate correcting or displacing force is necessary to move the casing member 21 for steering or corrective purposes.

While the steering effect is promptly applied by the operators 50, it cannot be violently or abruptly applied, owing to the relatively small cross section of the pipes 80 and the relatively small opening of each valve 70.

In Fig. 12 I have shown a modified construction in which a rotary pump 100 is mounted in a pipe 101 connecting opposed operators 102. The pump 100 may be rotated in either direction by a reversible motor 103. This arrangement does away with the necessity for providing pneumatic pressure from an outside source but is less positive in its locking action, as it is impossible to prevent a certain amount of slow leakage through a rotary pump.

Having thus described my invention and the advantages thereof, I do not wish to be limited to the details herein disclosed, otherwise than as set forth in the claims, but what I claim is:

1. Steering apparatus for aircraft having pivotally connected and relatively angularly displaceable casing members comprising a plurality of hydraulic displacing operators coacting in opposed pairs, a hydraulic cross connection for each pair forming a unitary and continuously closed hydraulic system therewith, a normally closed valve in each hydraulic connection, a solenoid effective to open said valve, means to apply pneumatic pressure to move a selected operator, and means to energize the associated solenoid to open the associated valve whenever pneumatic pressure is applied to either operator of an associated pair.

2. Steering apparatus for aircraft having pivotally connected and relatively angularly displaceable casing members comprising four hydraulic displacing operators coacting in opposed pairs, a hydraulic cross connection for each pair and forming a unitary continuously closed and sealed hydraulic system therewith, a separate and normally closed valve in each cross connection, a solenoid to open each valve, means to apply pneumatic pressure to a selected hydraulic operator, and means to energize the associated solenoid to move its valve and thereby open said cross connection when pneumatic pressure is applied to either operator of an associated pair.

3. In an aircraft steering apparatus, a steering device, a pair of opposed hydraulic operators therefor, a hydraulic connection between said operators, a valve in said connections which is normally closed and which is effective to lock said operators from movement, a pneumatic actuator for each operator and a supply pipe for each actuator, a solenoid connected to open said locking valve, a control circuit for said solenoid, and circuit-closing devices for said solenoid circuit, said devices being located in said supply pipes and said solenoid being rendered operative by initial flow of gas through either supply pipe to its pneumatic actuator.

4. The combination in a steering apparatus as set forth in claim 3, in which each circuit-closing device comprises a casing interposed in the associated supply pipe, a vane resiliently mounted in said casing and transversely displaceable by gas flow in said pipe and casing, and normally open contacts in said solenoid circuit which are closed by transverse displacement of said vanes.

5. Steering apparatus for aircraft having pivotally connected and relatively angularly displaceable casing members and comprising a plurality of hydraulic displacing operators coacting in opposed pairs, a hydraulic cross connection for each pair and forming therewith a unitary and continuously closed hydraulic system, a separate pneumatic actuator for each hydraulic operator, a normally closed valve in each hydraulic cross connection, separate means to open each normally closed valve in said hydraulic cross connections, and a control element associated with each pneumatic actuator and directly responsive to flow of the pneumatic medium to said actuator and effective to cause said valve-opening means to open the associated valve in one of said hydraulic cross connections on the occurrence of pneumatic flow to its associated actuator.

ROBERT H. GODDARD.